US012704451B2

(12) United States Patent
Wang et al.

(10) Patent No.: US 12,704,451 B2
(45) Date of Patent: Aug. 11, 2026

(54) METHOD AND DEVICE FOR PREDICTING ABILITY OF THE TEMPORARY PLUGGING AGENT TO PLUG CRACKS AND STORAGE MEDIUM

(71) Applicant: Beijing Institute of Petrochemical Technology, Beijing (CN)

(72) Inventors: Daobing Wang, Beijing (CN); Bo Yu, Beijing (CN); Haiyan Zhu, Beijing (CN); Fujian Zhou, Beijing (CN); Dongliang Sun, Beijing (CN); Xiongfei Liu, Beijing (CN); Tiankui Guo, Beijing (CN); Xiuhui Li, Beijing (CN); Xuanhe Tang, Beijing (CN); Xian Shi, Beijing (CN); Qing Liu, Beijing (CN); Yu Suo, Beijing (CN); Yang Shi, Beijing (CN)

(73) Assignee: Beijing Institute of Petrochemical Technology, Beijing (CN)

( * ) Notice: Subject to any disclaimer, the term of this patent is extended or adjusted under 35 U.S.C. 154(b) by 301 days.

(21) Appl. No.: 18/640,134

(22) Filed: Apr. 19, 2024

(65) Prior Publication Data

US 2024/0353304 A1 Oct. 24, 2024

(30) Foreign Application Priority Data

Apr. 20, 2023 (CN) ......................... 202310422865.6

(51) Int. Cl.
*G01N 15/08* (2006.01)

(52) U.S. Cl.
CPC ................................ *G01N 15/0826* (2013.01)

(58) Field of Classification Search
CPC ................................................. G01N 15/0826
See application file for complete search history.

(56) References Cited

U.S. PATENT DOCUMENTS

| | | | | |
|---|---|---|---|---|
| 4,075,886 A * | 2/1978 | Barker | ..................... | G01N 3/20 73/806 |
| 4,299,120 A * | 11/1981 | Barker | ..................... | G01N 3/08 73/87 |
| 4,665,984 A * | 5/1987 | Hayashi | ................ | E21B 49/006 166/308.1 |
| 2019/0057168 A1* | 2/2019 | Holland | ................. | G01V 20/00 |
| 2025/0258072 A1* | 8/2025 | Zhang | ...................... | G01N 3/06 |

* cited by examiner

*Primary Examiner* — Eric S. McCall
(74) *Attorney, Agent, or Firm* — Bay State IP, LLC

(57) ABSTRACT

The present disclosure relates to a method and a device for predicting ability of a temporary plugging agent to plug cracks and a storage medium, and includes the following steps: calculating a plane elastic modulus of a core through experiments, acquiring a maximum force load of a specimen, calculating rock fracture toughness through the maximum force load, manufacturing an artificial crack model and placing it in a core holder, preparing temporary plugging deflection fluid by selecting a temporary plugging agent, injecting the temporary plugging deflection fluid into the artificial crack so as to calculate apparent fracture toughness of the temporarily plugged crack, and finally calculating a fracture pressure of the temporarily plugged crack based on the calculated rock fracture toughness and the plane elastic modulus of the core. Through the above method, the present disclosure provides a standard fracture pressure calculation method.

10 Claims, 4 Drawing Sheets

METHOD AND DEVICE FOR PREDICTING ABILITY OF THE TEMPORARY PLUGGING AGENT TO PLUG CRACKS AND STORAGE MEDIUM

CROSS REFERENCE TO RELATED APPLICATION

This application claims the benefit of and takes priority from Chinese Patent Application No. 202310422865.6 filed on Apr. 20, 2023, the contents of which are herein incorporated by reference.

TECHNICAL FIELD

The present disclosure relates to the technical field of oil and gas engineering exploitation, in particular to a method and a device for predicting ability of a temporary plugging agent to plug cracks and a storage medium.

BACKGROUND

As one of the most important hydraulic fracturing technologies to enhance the complexity of artificial fracture network, a temporary plugging deflection fracturing technology mainly injects a temporary plugging agent to temporarily plug cracks to increase a net pressure in the cracks and force the cracks to deflect. Therefore, the plugging effect of the temporary plugging agent on artificial cracks affects the success or failure of temporary plugging and deflection fracturing construction.

At present, the plugging effect of the temporary plugging agent on the artificial cracks is mainly evaluated by indoor experiments, and the qualitative evaluation is mainly made by recording the curve of a plugging pressure changing with time during the experiment. It is considered that the greater the variation range of the plugging pressure, the stronger the pressure bearing capacity of the temporary plugging agent, and the better the plugging effect of the temporary plugging agent on cracks. However, the indoor experiment process is complicated, and a lot of liquid and experiment times need to be consumed, the experiment cost is expensive, and it is time-consuming, which is not conducive to evaluating the ability of the temporary plugging agent to plug cracks quickly and cheaply.

SUMMARY

In view of this, the purpose of the present disclosure is to provide a method and a device for predicting ability of a temporary plugging agent to plug cracks and a storage medium, so as to solve the problem in the prior art that the plugging ability of the temporary plugging agent is completely completed through indoor experiments, it is time-consuming, and the experiment cost is expensive, so that the plugging ability of each temporary plugging agent cannot be evaluated quickly and conveniently before the temporary plugging agent is used.

According to a first aspect of the embodiment of the present disclosure, there is provided a method for predicting ability of a temporary plugging agent to plug cracks, including:

acquiring an elastic modulus E and a Poisson's ratio v of a core through experiments, and acquiring a plane elastic modulus E' of the core through the elastic modulus E and the Poisson's ratio v;

prefabricating an initial crack with a certain length on a fracture toughness specimen to acquire a maximum force load $P_{max}$ of the fracture toughness specimen;

acquiring rock fracture toughness $K_{IC}$ through the length of the initial crack and the maximum force load $P_{max}$;

preparing an artificial crack model with a crack width of w and a crack height of H, and placing the artificial crack model in a core holder;

preparing temporary plugging deflection fluid by selecting any temporary plugging agent, applying a confining pressure Pc to the core holder, injecting the prepared temporary plugging deflection fluid into the crack with the width of w in the artificial crack model in the core holder at a certain rate, and temporarily plugging the crack;

acquiring the thickness $w_c$ of a filter cake forming a temporary plugging body in the crack with the width of w, and calculating apparent fracture toughness $$k_p^c$$

of the temporarily plugged crack through the rock fracture toughness $K_{IC}$, the plane elastic modulus E' of the core, the thickness $w_c$ of the filter cake and the confining pressure Pc;

acquiring a fracture pressure $$p_{tip}^c$$

of the temporarily plugged crack through the apparent fracture toughness $$k_p^c$$

and the crack height H, and predicting the ability of the selected temporary plugging agent to plug cracks by the fracture pressure $$p_{tip}^c$$

of the temporarily plugged crack.

Preferably, preparing an artificial crack model with a crack width of w and a crack height of H includes:

selecting an initial rock mass of a cylinder or a cube with a height of H, preparing an artificial initial crack at the top or bottom of the initial rock mass, dividing the initial rock mass into two fractured rock masses through the artificial initial crack, arranging a filler strip with a thickness of w on both sides of the fractured plane of any fractured rock mass, respectively, and attaching the two fractured rock masses along the fractured plane to restore the initial rock mass, wherein due to the existence of the filler strip, there are cracks with a width of w and a height of H on the initial rock mass, so as to obtain the artificial crack model with the crack width of w and the crack height of H.

Preferably, the formula of calculating the plane elastic modulus E' of the core is:

$$E' = \frac{E}{1 - v^2}$$

where E denotes the elastic modulus of the core, and v denotes the Poisson's ratio.

Preferably, prefabricating an initial crack with a certain length on a fracture toughness specimen to acquire a maximum force load $P_{max}$ of the fracture toughness specimen includes:

preparing a standard-shaped fracture toughness specimen, prefabricating an initial crack with a certain length at the bottom of the standard-shaped fracture toughness specimen, placing the bottom of the standard-shaped fracture toughness specimen on two support points at a certain distance for loading until the standard-shaped fracture toughness specimen fractures along the initial crack at the bottom, and acquiring the maximum force load $P_{max}$ of the standard-shaped fracture toughness specimen.

Preferably, the standard-shaped fracture toughness specimen includes a semi-disk SCB fracture toughness specimen and a cube or cuboid fracture toughness specimen;

the formula of calculating the rock fracture toughness $K_{IC}$ of the semi-disk SCB fracture toughness specimen is:

$$K_{IC} = \frac{P_{max}\sqrt{\pi a}}{2RB} Y^*$$

where $K_{IC}$ denotes rock fracture toughness; B denotes the thickness of the semi-disk SCB fracture toughness specimen; $P_{max}$ denotes the maximum force load of the semi-disk SCB fracture toughness specimen; a denotes the length of the initial crack prefabricated at the bottom of the semi-disk SCB fracture toughness specimen; R denotes the radius of the semi-disk SCB fracture toughness specimen; π denotes pi; and Y* is a dimensionless number;

the formula of calculating the dimensionless number Y* is:

$$Y^* = -1.297 + 9.516\frac{S}{2R} - \left(0.47 + 16.457\frac{S}{2R}\right)\beta + \left(1.071 + 34.401\frac{S}{2R}\right)\beta^2$$

where β=α/R, S denotes the distance between two support points;

the formula of calculating the rock fracture toughness $K_{IC}$ of the cube or cuboid fracture toughness specimen is as follows:

$$K_{IC} = \frac{P_{max}}{D^{1.5}} Y^*$$

where $K_{IC}$ denotes the rock fracture toughness; D denotes the height of the cube or cuboid fracture toughness specimen; $P_{max}$ denotes the maximum force load of the cube or cuboid fracture toughness specimen; and Y* is a dimensionless number;

the formula of calculating the dimensionless number Y* is as follows:

$$Y^* = \left[1.835 + 7.15\frac{a_0}{D} + 9.85\left(\frac{a_0}{D}\right)^2\right]\frac{S}{D}$$

where $a_0$ denotes the length of the prefabricated initial crack at the bottom of the cube or cuboid fracture toughness specimen, and S denotes the distance between two support points.

Preferably, preparing temporary plugging deflection fluid by selecting any temporary plugging agent includes:

selecting a mass concentration of 0.3% guar gum +0.15% crosslinking regulator +0.02% citric acid +0.3% crosslinking agent +0.5% any temporary plugging agent +98.73% water, and uniformly stirring for a period of time to form temporary plugging deflection fluid.

Preferably, the formula of calculating the apparent fracture toughness $$k_p^c$$

of the temporarily plugged crack is:

$$k_p^c = \frac{K_{IC}}{2} + \sqrt{\left(\frac{K_{IC}}{2}\right)^2 + \frac{E' w_c P_c}{2}}$$

where $$k_p^c$$

is the apparent fracture toughness of the temporarily plugged crack, $K_{IC}$ denotes the rock fracture toughness, E' denotes the plane elastic modulus of the core, $P_c$ denotes the applied confining pressure, and $w_c$ denotes the thickness of filter cake.

Preferably, the formula of calculating the fracture pressure $$p_{tip}^c$$

of the temporarily plugged crack is:

$$p_{tip}^c = coeff \times \frac{k_p^c}{2} \times \sqrt{\frac{\pi}{0.5H}} - \sigma_H$$

where H denotes the crack height of the artificial crack model, $$k_p^c$$

denotes the apparent fracture toughness of the temporarily plugged crack, $\sigma_H$ denotes the magnitude of a horizontal principal stress, $\sigma_H=P_c+P_p$, where $P_c$ denotes the applied confining pressure, $P_p$ denotes a pore pressure, the pore pressure $P_p$ of a stratum is a constant value, and coeff denotes a fitting coefficient.

According to a second aspect of the embodiment of the present disclosure, there is provided a device for predicting ability of a temporary plugging agent to plug cracks, including:

a plane elastic modulus acquiring module, which is configured to acquire an elastic modulus E and a Poisson's ratio v of a core through experiments, and acquire a plane elastic modulus E' of the core through the elastic modulus E and the Poisson's ratio v;

a maximum force load acquiring module, which is configured to prefabricate an initial crack with a certain length on a fracture toughness specimen to acquire a maximum force load $P_{max}$ of the fracture toughness specimen;

a rock fracture toughness acquiring module, which is configured to acquire rock fracture toughness $K_{IC}$ through the length of the initial crack, geometric parameters of the fracture toughness specimen and the maximum force load $P_{max}$;

an artificial crack model preparing module, which is configured to prepare an artificial crack model with a crack width of w and a crack height of H, and place the artificial crack model in a core holder;

an artificial crack temporary plugging module, which is configured to prepare temporary plugging deflection fluid by selecting any temporary plugging agent, apply a confining pressure Pc to the core holder, inject the prepared temporary plugging deflection fluid into the crack with the width of w in the artificial crack model in the core holder at a certain rate, and temporarily plug the crack;

an apparent fracture toughness acquiring module, which is configured to acquire the thickness $w_c$ of a filter cake forming a temporary plugging body in the crack with the width of w, and calculate apparent fracture toughness $$k_p^c$$

of the temporarily plugged crack through the rock fracture toughness $K_{IC}$, the plane elastic modulus E' of the core, the thickness $w_c$ of the filter cake and the confining pressure Pc;

a judging module, which is configured to acquire a fracture pressure $$p_{tip}^c$$

of the temporarily plugged crack through the apparent fracture toughness $$k_p^c$$

and the crack height H, and predict the ability of the selected temporary plugging agent to plug cracks by the fracture pressure $$p_{tip}^c$$

of the temporarily plugged crack.

According to a third aspect of an embodiment of the present disclosure, there is provided a storage medium, wherein a computer program is stored in the storage medium, and the computer program, when being executed by a master controller, implements each step in the method described above.

The technical scheme provided by the embodiment of the present disclosure can include the following beneficial effects.

The present disclosure includes: calculating a plane elastic modulus E' of a core through experiments, acquiring a maximum force load of a specimen according to the fracture toughness specimen, calculating rock fracture toughness $K_{IC}$ through the maximum force load, manufacturing an artificial crack model and placing it in a core holder, preparing temporary plugging deflection fluid by selecting a temporary plugging agent, injecting the temporary plugging deflection fluid into the artificial crack so as to calculate apparent fracture toughness $$k_p^c$$

of the temporarily plugged crack, and finally calculating a fracture pressure $$p_{tip}^c$$

of the temporarily plugged crack based on the calculated rock fracture toughness $K_{IC}$ and the plane elastic modulus E' of the core. Through the above method, the present disclosure provides a standard and specific fracture pressure calculation method of the temporarily plugged crack, which can be obtained only through a small amount of test results and theoretical calculation in the whole process. Compared with the prior art that the fracture pressure is obtained only through a test device, the present disclosure simplifies the experimental flow of the prior art, uses the theoretical calculation as an alternative, and reduces the time and cost.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

In the figures: 1—plane elastic modulus acquiring module, 2—maximum force load acquiring module, 3—rock fracture toughness acquiring module, 4—artificial crack model preparing module, 5—artificial crack temporary plugging module, 6—apparent fracture toughness acquiring module, and 7—judging module.

DETAILED DESCRIPTION OF THE EMBODIMENTS

Exemplary embodiments will be described in detail herein, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the present disclosure. Rather, the embodiments are merely examples of devices and methods consistent with some aspects of the present disclosure as detailed in the appended claims.

Embodiment 1

Figure 1:
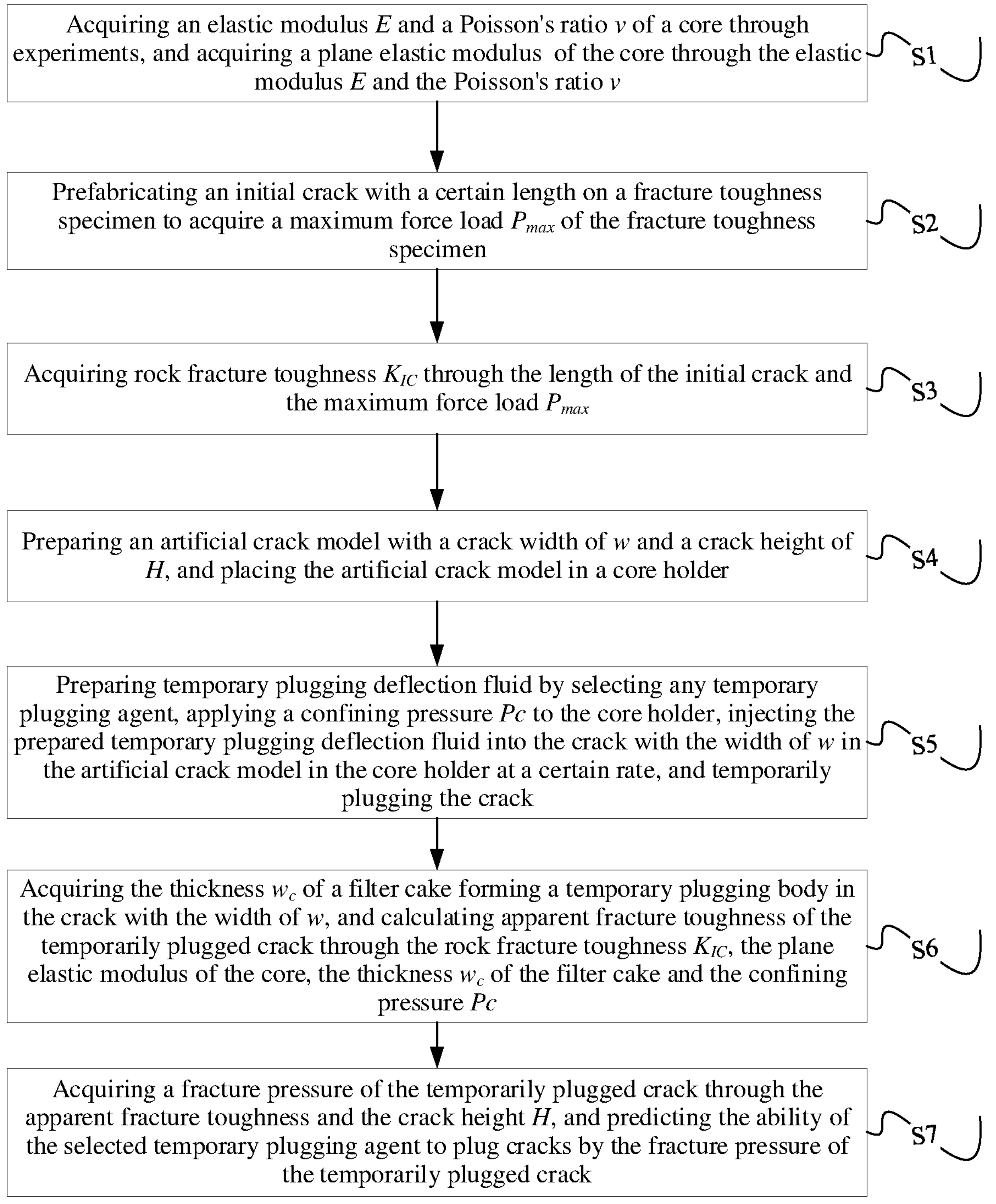
FIG. 1 is a schematic flow diagram of a method for predicting ability of a temporary plugging agent to plug cracks according to an exemplary embodiment.

FIG. 1 is a schematic flow diagram of a method for predicting ability of a temporary plugging agent to plug cracks according to an exemplary embodiment. As shown in FIG. 1, the method includes the following steps:

S1, acquiring an elastic modulus E and a Poisson's ratio v of a core through experiments, and acquiring a plane elastic modulus E' of the core through the elastic modulus E and the Poisson's ratio v;

S2, prefabricating an initial crack with a certain length on a fracture toughness specimen to acquire a maximum force load $P_{max}$ of the fracture toughness specimen;

S3, acquiring rock fracture toughness $K_{IC}$ through the length of the initial crack and the maximum force load $P_{max}$;

S4, preparing an artificial crack model with a crack width of w and a crack height of H, and placing the artificial crack model in a core holder;

S5, preparing temporary plugging deflection fluid by selecting any temporary plugging agent, applying a confining pressure Pc to the core holder, injecting the prepared temporary plugging deflection fluid into the crack with the width of w in the artificial crack model in the core holder at a certain rate, and temporarily plugging the crack;

S6, acquiring the thickness $w_c$ of a filter cake forming a temporary plugging body in the crack with the width of w, and calculating apparent fracture toughness $$k_p^c$$

of the temporarily plugged crack through the rock fracture toughness $K_{IC}$, the plane elastic modulus E' of the core, the thickness $w_c$ of the filter cake and the confining pressure Pc;

S7, acquiring a fracture pressure $$p_{tip}^c$$

of the temporarily plugged crack through the apparent fracture toughness $$k_p^c$$

and the crack height H, and predicting the ability of the selected temporary plugging agent to plug cracks by the fracture pressure $$p_{tip}^c$$

of the temporarily plugged crack.

It can be understood that in the present disclosure, a stress-strain curve of a standard cylindrical core with certain geometric parameters is tested by a triaxial experimental device of rock mechanics. An elastic modulus E and a Poisson's ratio v of a core are acquired, and a plane elastic modulus E' of the core is acquired through the elastic modulus E and the Poisson's ratio v of the core. According to the international experimental standards of rock mechanics, a standard-shaped fracture toughness specimen is prepared, an initial crack with a certain length is prefabricated at the center of the bottom of the specimen. The maximum force load, which is denoted as $P_{max}$, is obtained by loading the initial crack until it is destroyed. The rock fracture toughness $K_{IC}$ is acquired through the length of the initial crack and the maximum force load $P_{max}$. A splitting device is then used to prepare an artificial crack model with a crack width of w and a crack height of H, and the prepared artificial crack model is placed into the core holder. It is worth noting that the core holder is an instrument used to hold and protect the rock sample and seal the cylindrical surface or the end surface (usually the end surface with an inlet and an outlet of fluid) when measuring the seepage characteristics of the rock sample in the laboratory or carrying out displacement tests. Temporary plugging deflection fluid is prepared by selecting any temporary plugging agent. A confining pressure Pc is applied to the core holder. The prepared temporary plugging deflection fluid is injected into the crack with the width of w in the artificial crack model in the core holder at a certain rate, generally 10-30 ml/min, and the crack is temporarily plugged. The thickness (the thickness along the width direction of the crack) of the filter cake forming a temporary plugging body in the crack is measured, which is denoted as $w_c$. Apparent fracture toughness $$k_p^c$$

of the temporarily plugged crack is calculated through the rock fracture toughness $K_{IC}$, the plane elastic modulus E' of the core, the thickness $w_c$ of the filter cake and the confining pressure Pc which are acquired above. Finally, a fracture pressure $$p_{tip}^{c}$$

of the temporarily plugged crack through the apparent fracture toughness $$k_{p}^{c}$$

and the crack height H of the artificial crack model is acquired, and the ability of the selected temporary plugging agent to plug cracks is predicted by the fracture pressure $$p_{tip}^{c}$$

of the temporarily plugged crack. It is worth noting that the higher the fracture pressure value, the stronger the ability of the temporary plugging agent to plug cracks is. Different temporary plugging deflection fluid is prepared by different temporary plugging agents, and the fracture pressure of the temporarily plugged cracks is calculated respectively, so as to acquire the ability of different temporary plugging agents to plug cracks. A more suitable temporary plugging agent is screened before the actual temporary plugging deflection fracturing. The present disclosure includes: calculating a plane elastic modulus E' of a core through experiments, acquiring a maximum force load of a specimen according to the fracture toughness specimen, calculating rock fracture toughness $K_{IC}$ through the maximum force load, manufacturing an artificial crack model and placing it in a core holder, preparing temporary plugging deflection fluid by selecting a temporary plugging agent, injecting the temporary plugging deflection fluid into the artificial crack so as to calculate apparent fracture toughness $$k_{p}^{c}$$

of the temporarily plugged crack, and finally calculating a fracture pressure $$p_{tip}^{c}$$

of the temporarily plugged crack based on the calculated rock fracture toughness $K_{IC}$ and the plane elastic modulus E' of the core. Through the above method, the present disclosure provides a standard and specific fracture pressure calculation method of the temporarily plugged crack, which can be obtained only through a small amount of test results and theoretical calculation in the whole process. Compared with the prior art that the fracture pressure is obtained only through a test device, the present disclosure simplifies the experimental flow of the prior art, uses the theoretical calculation as an alternative, and reduces the time and cost.

Preferably, preparing an artificial crack model with a crack width of w and a crack height of H includes:

selecting an initial rock mass of a cylinder or a cube with a height of H, preparing an artificial initial crack at the top or bottom of the initial rock mass, dividing the initial rock mass into two fractured rock masses through the artificial initial crack, arranging a filler strip with a thickness of w on both sides of the fractured plane of any fractured rock mass, respectively, and attaching the two fractured rock masses along the fractured plane to restore the initial rock mass, wherein due to the existence of the filler strip, there are cracks with a width of w and a height of H on the initial rock mass, so as to obtain the artificial crack model with the crack width of w and the crack height of H.

It can be understood that an artificial initial crack is made on the top surface or bottom surface of an initial rock mass of a cylinder or a square (a cuboid or a cube) with a height of H. The initial crack has a length of generally 180 mm and a height of generally 38 mm. The initial rock mass of a cylinder or a rectangle with a height of H is split into two pieces through the artificial initial crack, and then any fractured rock mass is selected. On the top and bottom of the fractured plane of the fractured rock mass or on both sides of the fractured plane (because it is a cylinder, a cuboid or a cube, the fractured plane is rectangular, and the rectangle includes four sides, the present disclosure selects any two opposite sides of the four sides of the rectangle), two filler strips with a thickness of w are provided at the edges of any two opposite sides of the fractured plane, and the two fractured rock masses are attached along the fractured plane to restore the initial rock mass. It is worth emphasizing that if there are no filler strips, in the case that two fractured rock masses are attached along the fractured plane, the original initial rock mass will be restored. At most a crack can be seen on the surface of the initial rock mass. However, due to the existence of the filler strips, when the two fractured rock masses are attached, the two fractured rock masses can never be attached together, and there will be a crack with a width of w. That is to say, a narrow filler strip is used to simulate different crack widths w. Because the crack runs through the entire initial rock mass in the vertical direction and the height of the initial rock mass is H, an artificial crack model with a crack width of w and a crack height of H can be obtained.

Preferably, the formula of calculating the plane elastic modulus E' of the core is:

$$E' = \frac{E}{1 - v^2}$$

where E denotes the elastic modulus of the core, and v denotes the Poisson's ratio.

It can be understood that it has been described above that the elastic modulus E and the Poisson's ratio v of the core can be obtained by the stress-strain curve of the standard cylindrical core, and the plane elastic modulus E' of the core can be obtained by the formula $$E' = \frac{E}{1 - v^2},$$

so as to carry out the subsequent calculation.

Preferably, prefabricating an initial crack with a certain length on a fracture toughness specimen to acquire a maximum force load $P_{max}$ of the fracture toughness specimen includes:

preparing a standard-shaped fracture toughness specimen, prefabricating an initial crack with a certain length at the bottom of the standard-shaped fracture toughness specimen, placing the bottom of the standard-shaped fracture toughness specimen on two support points at a certain distance for loading until the standard-shaped fracture toughness specimen fractures along the initial crack at the bottom, and acquiring the maximum force load $P_{max}$ of the standard-shaped fracture toughness specimen.

Figure 4:
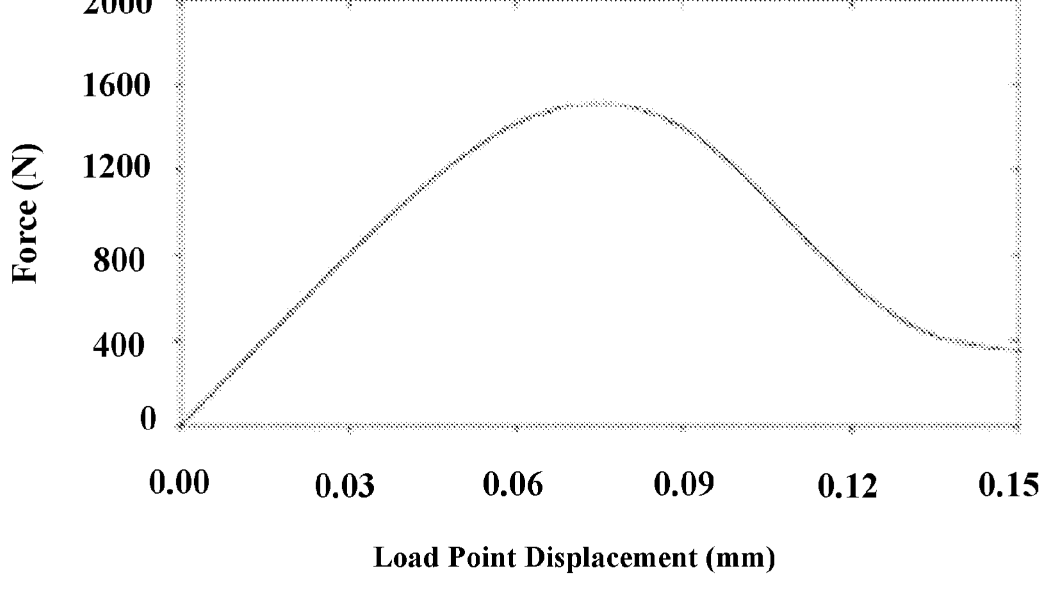
FIG. 4 is a schematic diagram showing a force-displacement curve according to an exemplary embodiment.
Figure 5:
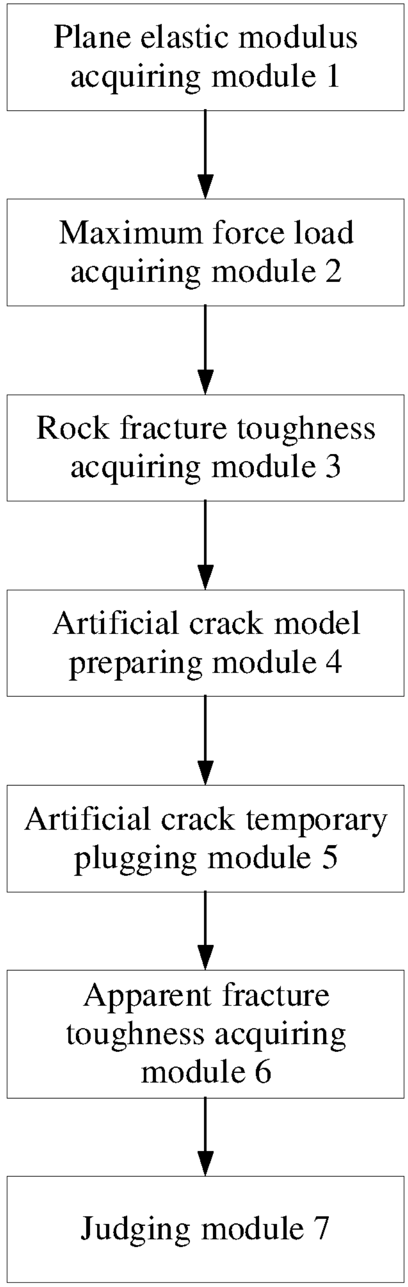
FIG. 5 is a system schematic diagram of a device for predicting ability of a temporary plugging agent to plug cracks according to an exemplary embodiment.

It can be understood that according to the international experimental standards of rock mechanics, a standard-shaped fracture toughness specimen is prepared, and an initial crack with a certain length is prefabricated at the bottom of the standard-shaped fracture toughness specimen. Thereafter, the fracture toughness specimen with an initial crack at the bottom is placed on two support points. It is worth emphasizing that the initial crack is generally located between the two support points, so that under the condition of downward pressure from the top of the fracture toughness specimen, due to the existence of the initial crack, the fracture toughness specimen will gradually be fractured into two halves along the initial crack. During this process, the curve of the applied pressure and the depth displacement of the crack can be acquired, as shown in FIG. 4, until the crack runs through the fracture toughness specimen, that is, the fracture toughness specimen is divided into two pieces. During the whole pressurization process, the maximum force load is the pressure used at the fracture moment of the fracture toughness specimen.

Figure 2:
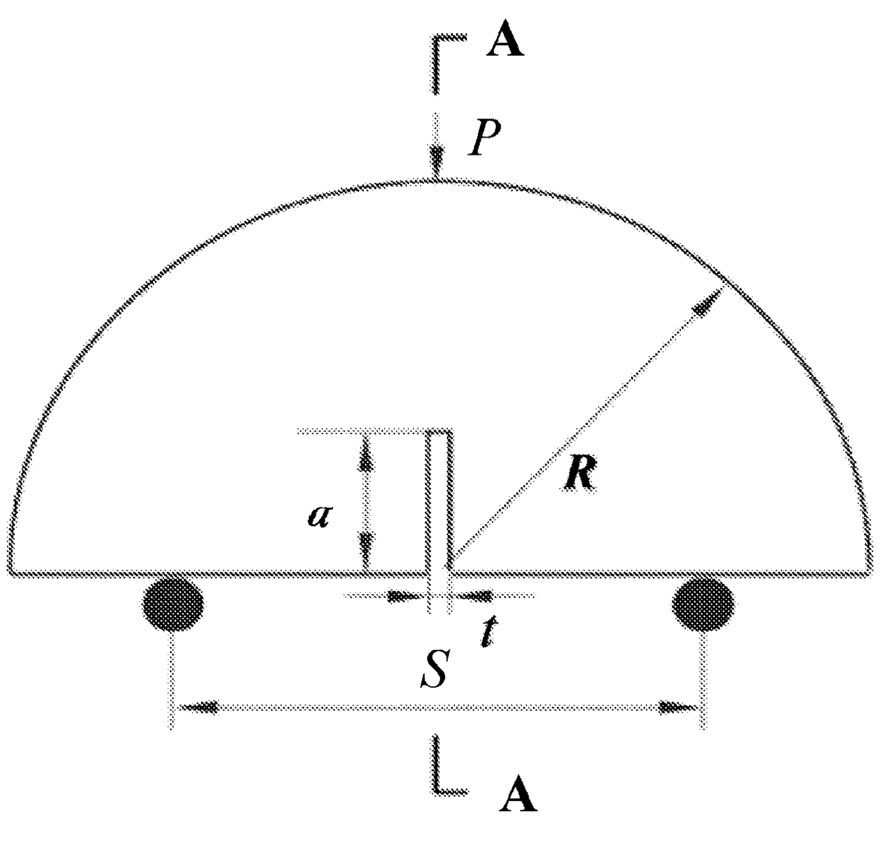
FIG. 2 is a schematic diagram of a semi-disk SCB fracture toughness specimen according to another exemplary embodiment.

Preferably, the standard-shaped fracture toughness specimen includes a semi-disk SCB fracture toughness specimen and a cube or cuboid fracture toughness specimen;

the formula of calculating the rock fracture toughness $K_{IC}$ of the semi-disk SCB fracture toughness specimen is:

$$K_{IC} = \frac{P_{max}\sqrt{\pi a}}{2RB}Y^*$$

where $K_{IC}$ denotes rock fracture toughness; B denotes the thickness of the semi-disk SCB fracture toughness specimen; $P_{max}$ denotes the maximum force load of the semi-disk SCB fracture toughness specimen; a denotes the length of the initial crack prefabricated at the bottom of the semi-disk SCB fracture toughness specimen; R denotes the radius of the semi-disk SCB fracture toughness specimen; π denotes pi; and Y* is a dimensionless number;

the formula of calculating the dimensionless number Y* is:

$$Y^* = -1.297 + 9.516\frac{S}{2R} - \left(0.47 + 16.457\frac{S}{2R}\right)\beta + \left(1.071 + 34.401\frac{S}{2R}\right)\beta^2$$

where β=a/R, S denotes the distance between two support points;

the formula of calculating the rock fracture toughness $K_{IC}$ of the cube or cuboid fracture toughness specimen is as follows:

$$K_{IC} = \frac{P_{max}}{D^{1.5}}Y^*$$

where $K_{IC}$ denotes the rock fracture toughness; D denotes the height of the cube or cuboid fracture toughness specimen; $P_{max}$ denotes the maximum force load of the cube or cuboid fracture toughness specimen; and Y* is a dimensionless number;

the formula of calculating the dimensionless number Y* is as follows:

$$Y^* = \left[1.835 + 7.15\frac{a_0}{D} + 9.85\left(\frac{a_0}{D}\right)^2\right]\frac{S}{D}$$

where $a_0$ denotes the length of the prefabricated initial crack at the bottom of the cube or cuboid fracture toughness specimen, and S denotes the distance between two support points. It can be understood that the standard-shaped fracture toughness specimen described above is generally a semi-disk or a cube (a cuboid or a cube). As shown in FIG. 2, if the specimen is a semi-disk SCB fracture toughness specimen, the specimens has a thickness of generally 35 mm and a diameter of generally 70 mm, and an initial crack with a width of 1 mm and a length of 17 mm is prefabricated at the center of the bottom of the semi-disk specimen. The length and the width of the initial crack herein can be freely selected. According to the radius and the thickness of the specimen, the suitable initial crack is selected, the length and the width of which are not fixedly limited. The formula of calculating the rock fracture toughness $K_{IC}$ of the semi-disk SCB fracture toughness specimen is:

$$K_{IC} = \frac{P_{max}\sqrt{\pi a}}{2RB}Y^*$$

The formula of calculating the dimensionless number Y* is:

$$Y^* = -1.297 + 9.516\frac{S}{2R} - \left(0.47 + 16.457\frac{S}{2R}\right)\beta + \left(1.071 + 34.401\frac{S}{2R}\right)\beta^2$$

Figure 3:
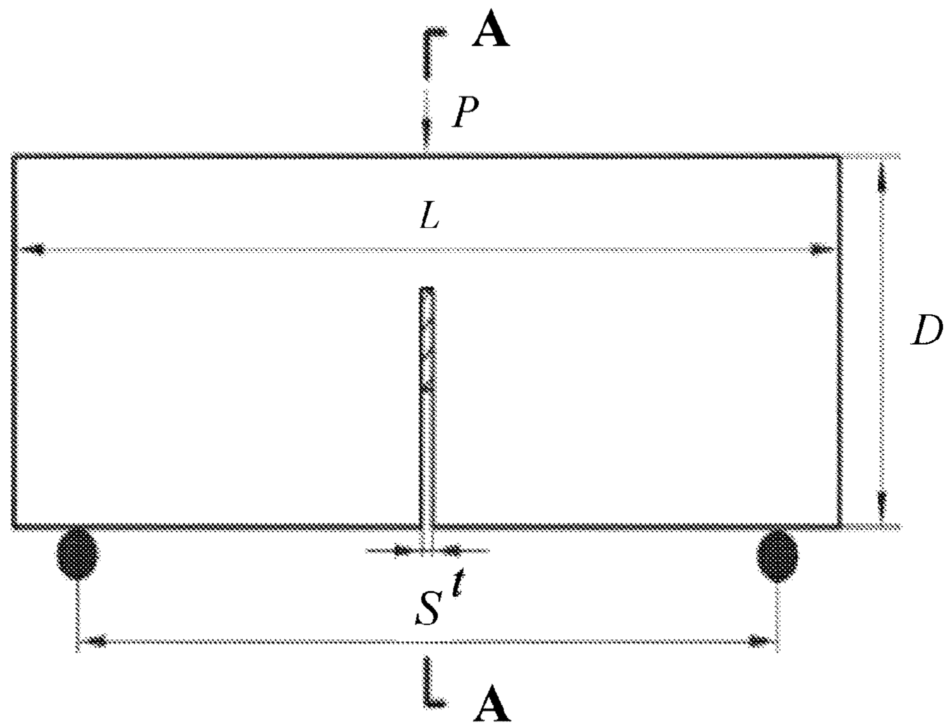
FIG. 3 is a schematic diagram of a square fracture toughness specimen according to another exemplary embodiment.

As shown in FIG. 3, the formula of calculating the rock fracture toughness $K_{IC}$ of the square fracture toughness specimen is:

$$K_{IC} = \frac{P_{max}}{D^{1.5}}Y^*$$

The formula of calculating the dimensionless number Y* is:

$$Y^* = \left[1.835 + 7.15\frac{a_0}{D} + 9.85\left(\frac{a_0}{D}\right)^2\right]\frac{S}{D}$$

where $a_0$ denotes the length of the prefabricated initial crack at the bottom of the cube or cuboid fracture toughness specimen, and S denotes the distance between two support points.

It is worth emphasizing that in the calculation of the dimensionless number Y*, the quantitative values are not related to the length, width, height, thickness and radius of the fracture toughness specimen, but only related to the shape of the fracture toughness specimen (the semi-disk or the square), which is a formula obtained through experiments in the prior art.

Preferably, preparing temporary plugging deflection fluid by selecting any temporary plugging agent includes:

selecting a mass concentration of 0.3% guar gum +0.15% crosslinking regulator +0.02% citric acid +0.3% crosslinking agent +0.5% any temporary plugging agent +98.73% water, and uniformly stirring for a period of time to form temporary plugging deflection fluid.

It can be understood that, if 100 mL of temporary plugging deflection fluid needs to be prepared, 0.3 mL of guar gum, 0.15 mL of crosslinking regulator, 0.02 mL of citric acid, 0.3 mL of crosslinking agent and 0.5 mL of the temporary plugging agent are needed, and the remaining 98.73 mL is water. Temporary plugging deflection fluid can be formed after being uniformly stirred for a period of time. It is worth emphasizing that in the subsequent verification of the ability of various temporary plugging agents to plug cracks, when temporary plugging deflection fluid is prepared, in order to control variables, the contents of all other components such as guar gum, crosslinking agent and water are unchanged, and only the type of temporary plugging agents is replaced.

Preferably, the formula of calculating the apparent fracture toughness $$k_p^c$$

of the temporarily plugged crack is:

$$k_p^c = \frac{K_{IC}}{2} + \sqrt{\left(\frac{K_{IC}}{2}\right)^2 + \frac{E' w_c P_c}{2}}$$

where $$k_p^c$$

is the apparent fracture toughness of the temporarily plugged crack, $K_{IC}$ denotes the rock fracture toughness, E' denotes the plane elastic modulus of the core, $P_c$ denotes the applied confining pressure, and $w_c$ denotes the thickness of filter cake.

Preferably, the formula of calculating the fracture pressure $$p_{tip}^c$$

of the temporarily plugged crack is:

$$p_{tip}^c = \text{coeff} \times \frac{k_p^c}{2} \times \sqrt{\frac{\pi}{0.5H}} - \sigma_H$$

where H denotes the crack height of the artificial crack model, $$k_p^c$$

denotes the apparent fracture toughness of the temporarily plugged crack, $\sigma_H$ denotes the magnitude of a horizontal principal stress, $\sigma_H = P_c + P_p$, where $P_c$ denotes the applied confining pressure, $P_p$ denotes a pore pressure, the pore pressure $P_p$ of a stratum is a constant value, and coeff denotes a fitting coefficient.

It can be understood that in the formula of calculating the fracture pressure $$p_{tip}^c$$

of the temporarily plugged crack, coeff denotes a fitting coefficient, which is 0.87.

In order to facilitate the understanding of the above scheme, this embodiment takes specific numerical values as an example to demonstrate the ability of each temporary plugging agent to plug cracks as shown below.

Calculation Example 1

The core has an elastic modulus E of 30 GPa and a Poisson's ratio of v=0.25 through experiments. E'=32 GPA of the core 1 is obtained according to the above formula of calculating the plane elastic modulus E' of the core described above. Taking the semi-disk SCB fracture toughness specimen as an example, the semi-disk SCB fracture toughness specimen with a thickness of 35 mm and a diameter of 70 mm is prepared, and an initial crack with a width of 1 mm and a length of 17 mm is prefabricated at the center of the bottom of the specimen. The maximum force load $P_{max}$=13.145 kN of the semi-disk SCB fracture toughness specimen is obtained through experiments. $K_{IC}$=4.575 $MPa \cdot m^{1/2}$ is obtained according to the formula of calculating the rock fracture toughness $K_{IC}$ described above. An artificial crack model with a crack width of 6 mm and a crack height of 38 mm is prepared, and the artificial crack model is placed in a core holder. Temporary plugging deflection fluid A is prepared through 0.5 mL of the temporary plugging agent A according to the above preparation method. The confining pressure $P_c$=25 MPa is applied. Temporary plugging deflection fluid A is injected into the artificial crack model at a speed of 10 mL/min to obtain a filter cake A. By measurement, the thickness $w_c$=5.5 mm of the filter cake A is obtained. Through the formula of calculating the apparent fracture toughness $$k_p^c$$

of the temporarily plugged crack described above, $$k_p^c = 2.6443\ \mathrm{MPa \cdot m^{1/2}}$$

can be obtained. Finally, through the formula of calculating the fracture pressure $$p_{tip}^c$$

of the temporarily plugged crack, $$p_{tip}^c = 14.79MPa$$

can be obtained.

Calculation Example 2

On the basis of the calculation example 1, the previous data keeps unchanged. When preparing temporary plugging deflection fluid, temporary plugging deflection fluid B is obtained by replacing the original temporary plugging deflection fluid A with 0.5 mL of temporary plugging deflection fluid B. The confining pressure $P_c$=25 MPa is applied. Temporary plugging deflection fluid B is injected into the artificial crack model at a speed of 10 mL/min to obtain a filter cake B. By measurement, the thickness $w_c$=4.5 mm of the filter cake B is obtained. Through the formula of calculating the apparent fracture toughness $$k_p^c$$

of the temporarily plugged crack described above, $$k_p^c = 2.5831MPa \cdot m^{1/2}$$

can be obtained. Finally, through the formula of calculating the fracture pressure $$p_{tip}^c$$

of the temporarily plugged crack, $$p_{tip}^c = 14.45MPa$$

can be obtained.

By comparing the calculation example 1 and the calculation example 2, it can be found that under the condition of keeping all conditions unchanged and only changing the temporary plugging agent, the thickness of the filter cake formed in the artificial crack model with the same crack width is different due to different temporary plugging agents, which leads to the apparent fracture toughness $$k_p^c$$

of the temporarily plugged crack. Finally, the fracture pressure $$p_{tip}^c$$

of the temporarily plugged crack is different due to the different apparent fracture toughness $$k_p^c$$

of the temporarily plugged crack. By comparison, it is found that the fracture pressure of the temporary plugging agent A is greater than that of the temporary plugging agent B, so that plugging ability of the temporary plugging agent A is superior to that of the temporary plugging agent B.

Embodiment 2

FIG. 4 is a system schematic diagram of a device for predicting ability of a temporary plugging agent to plug cracks according to an exemplary embodiment, including:

a plane elastic modulus acquiring module 1, which is configured to acquire an elastic modulus E and a Poisson's ratio v of a core through experiments, and acquire a plane elastic modulus E' of the core through the elastic modulus E and the Poisson's ratio v;

a maximum force load acquiring module 2, which is configured to prefabricate an initial crack with a certain length on a fracture toughness specimen to acquire a maximum force load $P_{max}$ of the fracture toughness specimen;

a rock fracture toughness acquiring module 3, which is configured to acquire rock fracture toughness $K_{IC}$ through the length of the initial crack, geometric parameters of the fracture toughness specimen and the maximum force load $P_{max}$;

an artificial crack model preparing module 4, which is configured to prepare an artificial crack model with a crack width of w and a crack height of H, and place the artificial crack model in a core holder;

an artificial crack temporary plugging module 5, which is configured to prepare temporary plugging deflection fluid by selecting any temporary plugging agent, apply a confining pressure Pc to the core holder, inject the prepared temporary plugging deflection fluid into the crack with the width of w in the artificial crack model in the core holder at a certain rate, and temporarily plug the crack;

an apparent fracture toughness acquiring module 6, which is configured to acquire the thickness $w_c$ of a filter cake forming a temporary plugging body in the crack with the width of w, and calculate apparent fracture toughness $$k_p^c$$

of the temporarily plugged crack through the rock fracture toughness $K_{IC}$, the plane elastic modulus E' of the core, the thickness $w_c$ of the filter cake and the confining pressure Pc;

a judging module 7, which is configured to acquire a fracture pressure $$p_{tip}^{c}$$

of the temporarily plugged crack through the apparent fracture toughness $$k_{p}^{c}$$

and the crack height H, and predict the ability of the selected temporary plugging agent to plug cracks by the fracture pressure $$p_{tip}^{c}$$

of the temporarily plugged crack.

It can be understood that in the present disclosure, the plane elastic modulus acquiring module 1 is configured to acquire an elastic modulus E and a Poisson's ratio v of a core through experiments, and acquire a plane elastic modulus E' of the core through the elastic modulus E and the Poisson's ratio v; the maximum force load acquiring module 2 is configured to prefabricate an initial crack with a certain length on a fracture toughness specimen to acquire a maximum force load $P_{max}$ of the fracture toughness specimen; the rock fracture toughness acquiring module 3 is configured to acquire rock fracture toughness $K_{IC}$ through the length of the initial crack, geometric parameters of the fracture toughness specimen and the maximum force load $P_{max}$; the artificial crack model preparing module 4 is configured to prepare an artificial crack model with a crack width of w and a crack height of H, and place the artificial crack model in a core holder; the artificial crack temporary plugging module 5 is configured to prepare temporary plugging deflection fluid by selecting any temporary plugging agent, apply a confining pressure Pc to the core holder, inject the prepared temporary plugging deflection fluid into the crack with the width of w in the artificial crack model in the core holder at a certain rate, and temporarily plug the crack; the apparent fracture toughness acquiring module 6 is configured to acquire the thickness $w_c$ of a filter cake forming a temporary plugging body in the crack with the width of w, and calculate apparent fracture toughness $$k_{p}^{c}$$

of the temporarily plugged crack through the rock fracture toughness $K_{IC}$, the plane elastic modulus E' of the core, the thickness $w_c$ of the filter cake and the confining pressure Pc; the judging module 7 is configured to acquire a fracture pressure $$p_{tip}^{c}$$

of the temporarily plugged crack through the apparent fracture toughness $$k_{p}^{c}$$

and the crack height H, and predict the ability of the selected temporary plugging agent to plug cracks by the fracture pressure $$p_{tip}^{c}$$

of the temporarily plugged crack. The present disclosure includes: calculating a plane elastic modulus E' of a core through experiments, acquiring a maximum force load of a specimen according to the fracture toughness specimen, calculating rock fracture toughness $K_{IC}$ through the maximum force load, manufacturing an artificial crack model and placing it in a core holder, preparing temporary plugging deflection fluid by selecting a temporary plugging agent, injecting the temporary plugging deflection fluid into the artificial crack so as to calculate apparent fracture toughness $$k_{p}^{c}$$

of the temporarily plugged crack, and finally calculating a fracture pressure $$p_{tip}^{c}$$

of the temporarily plugged crack based on the calculated rock fracture toughness $K_{IC}$ and the plane elastic modulus E' of the core. Through the above method, the present disclosure provides a standard and specific fracture pressure calculation method of the temporarily plugged crack, which can be obtained only through a small amount of test results and theoretical calculation in the whole process. Compared with the prior art that the fracture pressure is obtained only through a test device, the present disclosure simplifies the experimental flow of the prior art, uses the theoretical calculation as an alternative, and reduces the time and cost.

Embodiment 3

This embodiment provides a storage medium, wherein a computer program is stored in the storage medium, and the computer program, when being executed by a master controller, implements each step in the method described above.

It can be understood that the storage medium mentioned above can be a read-only memory, a magnetic disk or an optical disk, etc.

It can be understood that the same or similar parts in the above-mentioned embodiments can refer to each other, and what is not explained in detail in some embodiments can refer to the same or similar parts in other embodiments.

It should be noted that in the description of the present disclosure, the terms "first" and "second" are only used for the purpose of description and cannot be understood as indicating or implying relative importance. In addition, in the description of the present disclosure, unless otherwise specified, "a plurality of" means at least two.

Any process or method description in the flowchart or otherwise described herein can be understood as representing a module, segment or part of the code that includes one or more executable instructions for implementing steps of specific logical functions or the process, and the scope of preferred embodiments of the present disclosure includes other implementations, in which functions can be performed out of the order shown or discussed, including in a substantially simultaneous manner or in the reverse order according to the functions involved, which should be understood by those skilled in the art to which embodiments of the present disclosure belong.

It should be understood that various parts of the present disclosure can be implemented in hardware, software, firmware or a combination thereof. In the above embodiments, a plurality of steps or methods can be implemented by software or firmware stored in a memory and executed by an appropriate instruction execution system. For example, if the steps or methods are implemented in hardware, as in another embodiment, the steps or methods can be implemented by any one of the following technologies known in the art or the combination thereof: a discrete logic circuit with a logic gate circuit for implementing a logic function on a data signal, an application specific integrated circuit with a suitable combinational logic gate circuit, a Programmable Gate Array (PGA), a Field Programmable Gate Array (FPGA), and the like.

Those skilled in the art can understand that all or part of the steps carried by the above embodiment method can be completed by instructing related hardware through a program, which can be stored in a computer-readable storage medium. The program, when executed, includes one of the steps of the method embodiment or the combination thereof.

In addition, each functional unit in each embodiment of the present disclosure may be integrated in one processing module, or each unit may exist physically alone, or two or more units may be integrated in one module. The above integrated module can be realized in the form of hardware or software functional modules. The integrated module can also be stored in a computer-readable storage medium if it is implemented in the form of a software functional module and sold or used as an independent product.

The storage medium mentioned above can be a read-only memory, a magnetic disk or an optical disk, etc.

In the description of this specification, descriptions referring to the terms "one embodiment", "some embodiments", "examples", "specific examples" or "some examples" mean that specific features, structures, materials or characteristics described in connection with this embodiment or example are included in at least one embodiment or example of the present disclosure. In this specification, the schematic expressions of the above terms do not necessarily refer to the same embodiment or example. Moreover, the specific features, structures, materials or characteristics described may be combined in any one or more embodiments or examples in a suitable manner.

Although the embodiments of the present disclosure have been shown and described above, it can be understood that the above embodiments are exemplary and cannot be understood as limitations of the present disclosure. Those skilled in the art can make changes, modifications, substitutions and variations to the above embodiments within the scope of the present disclosure.

What is claimed is:

1. A method for predicting ability of a temporary plugging agent to plug cracks, comprising:

acquiring an elastic modulus E and a Poisson's ratio v of a core through experiments, and acquiring a plane elastic modulus E' of the core through the elastic modulus E and the Poisson's ratio v;

prefabricating an initial crack with a certain length on a fracture toughness specimen to acquire a maximum force load $P_{max}$ of the fracture toughness specimen;

acquiring rock fracture toughness $K_{IC}$ through the length of the initial crack and the maximum force load $P_{max}$;

preparing an artificial crack model with a crack width of w and a crack height of H, and placing the artificial crack model in a core holder;

preparing temporary plugging deflection fluid by selecting any temporary plugging agent, applying a confining pressure Pc to the core holder, injecting the prepared temporary plugging deflection fluid into the crack with the width of w in the artificial crack model in the core holder at a certain rate, and temporarily plugging the crack;

acquiring the thickness $w_c$ of a filter cake forming a temporary plugging body in the crack with the width of w, and calculating apparent fracture toughness $$k_p^c$$

of the temporarily plugged crack through the rock fracture toughness $K_{IC}$, the plane elastic modulus E' of the core, the thickness $w_c$ of the filter cake and the confining pressure Pc;

acquiring a fracture pressure $$p_{tip}^c$$

of the temporarily plugged crack through the apparent fracture toughness $$k_p^c$$

and the crack height H, and predicting the ability of the selected temporary plugging agent to plug cracks by the fracture pressure $$p_{tip}^c$$

of the temporarily plugged crack.

2. The method according to claim 1, wherein preparing an artificial crack model with a crack width of w and a crack height of H comprises:

selecting an initial rock mass of a cylinder or a cube with a height of H, preparing an artificial initial crack at the top or bottom of the initial rock mass, dividing the initial rock mass into two fractured rock masses through the artificial initial crack, arranging a filler strip with a thickness of w on both sides of the fractured plane of any fractured rock mass, respectively, and attaching the two fractured rock masses along the fractured plane to restore the initial rock mass, wherein due to the existence of the filler strip, there are cracks with a width of w and a height of H on the initial rock mass, so as to obtain the artificial crack model with the crack width of w and the crack height of H.

3. A storage medium, wherein a computer program is stored in the storage medium, and the computer program, when being executed by a master controller, implements each step in the method for predicting ability of the temporary plugging agent to plug cracks according to claim 1.

4. The method according to claim 1, wherein the formula of calculating the plane elastic modulus E' of the core is:

$$E' = \frac{E}{1 - v^2}$$

where E denotes the elastic modulus of the core, and v denotes the Poisson's ratio.

5. The method according to claim 4, wherein prefabricating an initial crack with a certain length on a fracture toughness specimen to acquire a maximum force load $P_{max}$ of the fracture toughness specimen comprises the following steps:

preparing a standard-shaped fracture toughness specimen, prefabricating an initial crack with a certain length at the bottom of the standard-shaped fracture toughness specimen, placing the bottom of the standard-shaped fracture toughness specimen on two support points at a certain distance for loading until the standard-shaped fracture toughness specimen fractures along the initial crack at the bottom, and acquiring the maximum force load $P_{max}$ of the standard-shaped fracture toughness specimen.

6. The method according to claim 5, wherein the standard-shaped fracture toughness specimen comprises a semi-disk SCB fracture toughness specimen and a cube or cuboid fracture toughness specimen;

the formula of calculating the rock fracture toughness $K_{IC}$ of the semi-disk SCB fracture toughness specimen is:

$$K_{IC} = \frac{P_{max}\sqrt{\pi a}}{2RB} Y^*$$

where $K_{IC}$ denotes rock fracture toughness; B denotes the thickness of the semi-disk SCB fracture toughness specimen; $P_{max}$ denotes the maximum force load of the semi-disk SCB fracture toughness specimen; a denotes the length of the initial crack prefabricated at the bottom of the semi-disk SCB fracture toughness specimen; R denotes the radius of the semi-disk SCB fracture toughness specimen; π denotes pi; and Y* is a dimensionless number;

the formula of calculating the dimensionless number Y* is:

$$Y^* = -1.297 + 9.516\frac{S}{2R} - \left(0.47 + 16.457\frac{S}{2R}\right)\beta + \left(1.071 + 34.401\frac{S}{2R}\right)\beta^2$$

where β=a/R, S denotes the distance between two support points;

the formula of calculating the rock fracture toughness $K_{IC}$ of the cube or cuboid fracture toughness specimen is as follows:

$$K_{IC} = \frac{P_{max}}{D^{1.5}} Y^*$$

where $K_{IC}$ denotes the rock fracture toughness; D denotes the height of the cube or cuboid fracture toughness specimen; $P_{max}$ denotes the maximum force load of the cube or cuboid fracture toughness specimen; and Y* is a dimensionless number;

the formula of calculating the dimensionless number Y* is as follows:

$$Y^* = \left[1.835 + 7.15\frac{a_0}{D} + 9.85\left(\frac{a_0}{D}\right)^2\right]\frac{S}{D}$$

where $a_0$ denotes the length of the prefabricated initial crack at the bottom of the cube or cuboid fracture toughness specimen, and S denotes the distance between two support points.

7. The method according to claim 5, wherein preparing temporary plugging deflection fluid by selecting any temporary plugging agent comprises:

selecting a mass concentration of 0.3% guar gum +0.15% crosslinking regulator +0.02% citric acid +0.3% crosslinking agent +0.5% any temporary plugging agent +98.73% water, and uniformly stirring for a period of time to form temporary plugging deflection fluid.

8. The method according to claim 7, wherein the formula of calculating the apparent fracture toughness $$k_p^c$$

of the temporarily plugged crack is:

$$k_p^c = \frac{K_{IC}}{2} + \sqrt{\left(\frac{K_{IC}}{2}\right)^2 + \frac{E' w_c P_c}{2}}$$

where $$k_p^c$$

is the apparent fracture toughness of the temporarily plugged crack, $K_{IC}$ denotes the rock fracture toughness, E' denotes the plane elastic modulus of the core, $P_c$ denotes the applied confining pressure, and $w_c$ denotes the thickness of filter cake.

9. The method according to claim 8, wherein the formula of calculating the fracture pressure $$p_{tip}^c$$

of the temporarily plugged crack is:

$$p_{tip}^{c}=\text{coeff}\times\frac{k_p^c}{2}\times\sqrt{\frac{\pi}{0.5H}}-\sigma_H$$

where H denotes the crack height of the artificial crack model, $$k_p^c$$

denotes the apparent fracture toughness of the temporarily plugged crack, $\sigma_H$ denotes the magnitude of a horizontal principal stress, $\sigma_H=P_c+P_p$, where $P_c$ denotes the applied confining pressure, $P_p$ denotes a pore pressure, the pore pressure $P_p$ of a stratum is a constant value, and coeff denotes a fitting coefficient.

10. A device for predicting ability of a temporary plugging agent to plug cracks, comprising:

- a plane elastic modulus acquiring module, which is configured to acquire an elastic modulus E and a Poisson's ratio v of a core through experiments, and acquire a plane elastic modulus E' of the core through the elastic modulus E and the Poisson's ratio v;
- a maximum force load acquiring module, which is configured to prefabricate an initial crack with a certain length on a fracture toughness specimen to acquire a maximum force load $P_{max}$ of the fracture toughness specimen;
- a rock fracture toughness acquiring module, which is configured to acquire rock fracture toughness $K_{IC}$ through the length of the initial crack, geometric parameters of the fracture toughness specimen and the maximum force load $P_{max}$;
- an artificial crack model preparing module, which is configured to prepare an artificial crack model with a crack width of w and a crack height of H, and place the artificial crack model in a core holder;
- an artificial crack temporary plugging module, which is configured to prepare temporary plugging deflection fluid by selecting any temporary plugging agent, apply a confining pressure Pc to the core holder, inject the prepared temporary plugging deflection fluid into the crack with the width of w in the artificial crack model in the core holder at a certain rate, and temporarily plug the crack;
- an apparent fracture toughness acquiring module, which is configured to acquire the thickness $w_c$ of a filter cake forming a temporary plugging body in the crack with the width of w, and calculate apparent fracture toughness $$k_p^c$$

of the temporarily plugged crack through the rock fracture toughness $K_{IC}$, the plane elastic modulus E' of the core, the thickness $w_c$ of the filter cake and the confining pressure Pc;

- a judging module, which is configured to acquire a fracture pressure $$p_{tip}^c$$

of the temporarily plugged crack through the apparent fracture toughness $$k_p^c$$

and the crack height H, and predict the ability of the selected temporary plugging agent to plug cracks by the fracture pressure $$p_{tip}^c$$

of the temporarily plugged crack.

* * * * *